June 12, 1962 H. NOTTER 3,038,638
METERING MECHANISM FOR A FILLING STATION
Filed Feb. 9, 1960
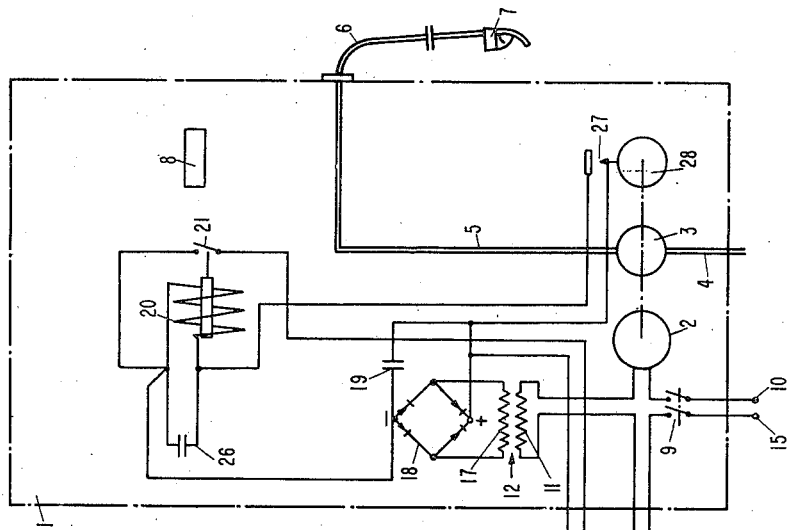
Fig. 1
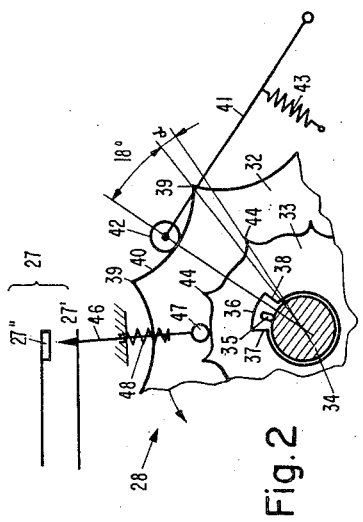
Fig. 2
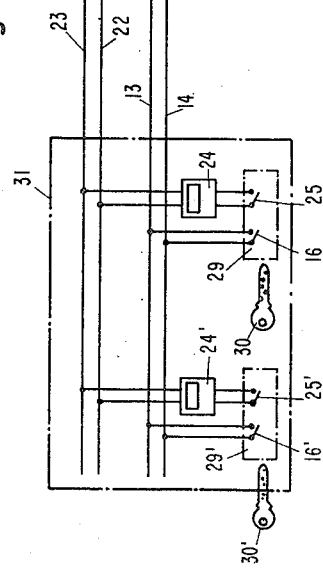

United States Patent Office 3,038,638
Patented June 12, 1962

3,038,638
METERING MECHANISM FOR A
FILLING STATION
Herbert Notter, 11 Greifenseestrasse, Zurich, Switzerland
Filed Feb. 9, 1960, Ser. No. 7,575
Claims priority, application Switzerland Feb. 11, 1959
8 Claims. (Cl. 222—26)

The present invention relates to a metering mechanism for a gasoline or diesel oil filling station having a main counter indicating the total amount of motor fuel drawn, and auxiliary counters indicating the amount of motor fuel drawn by individual consumers, each having a separate key fitting a lock switch associated with one of the said auxiliary counters.

The invention has the main object of providing such a mechanism which is simple and inexpensive in construction and operation and allows the addition of further auxiliary counters without difficulty.

It is another object of the invention to provide a metering mechanism of this kind which can be subsequently fitted to an existing filling station without difficulty.

It is yet another object of the invention to provide a metering device of the kind referred to which safely obviates the possibility of the same amounts of liquid fuel, however small, being debited erroneously to two different consumers.

With these and other objects in view which will become apparent later from this specification and the accompanying drawing, I provide a metering mechanism for a filling station comprising in combination: a pump capable of pumping the liquid fuel, an electric motor in driving connection with the said pump, a main metering means metering the total amount of liquid fuel pumped by the said pump, an impulse generator coupled to the said main metering means, a plurality of electric impulse counters each being capable of being electrically connected to the said impulse generator, a plurality of electric lock switches, each electrically connected to one of the said impulse counters and when operated by an external individual key connecting its associated impulse counter to the said impulse generator, the said associated impulse counter then metering the quantity of liquid fuel dispensed while its associated lock switch is operated.

Preferably each of the said lock switches comprises two switches, one of them being connected into the circuit of its associated impulse counter, and the second one controlling the circuit of the said electric motor in the sense of keeping it open unless the lock switch is operated.

The said impulse generator comprises cam means and resilient follower means operatively contacting said cam means and operatively connected to the switch of said impulse generator keeping it normally closed and only instantaneously closing the same in response to the said cam means, independently of the speed at which the said impulse generator is driven by the said main fuel metering means.

These and other features of my said invention will be clearly understood from the following description of a preferred embodiment thereof given merely by way of example with reference to the accompanying drawing, in which:

FIG. 1 is a circuit diagram of a metering mechanism, and

FIG. 2 is a diagrammatic illustration of an impulse generator thereof.

In a pillar 1 of a filling station an electric motor 2 is provided which is capable of driving a pump 3 designed as a metering mechanism, which as every stroke sucks through a suction pipe 4 a predetermined volume of gasoline, diesel oil or the like from a tank, and supplies the same through a feeder pipe 5 to a filling hose 6, which is provided at its free end with a discharge valve 7. The quantity of liquid fuel fed by the metering pump 3 is indicated by a main counter 8 which is mechanically connected to the pump in a conventional manner (not shown). The discharge valve 7 is suspended, when not in use, on a hook (not shown), which is coupled in the usual manner with a double-pole main switch 9 in such a manner that when taking the discharge valve 7 off the hook this main switch is automatically closed.

By the closing of the switch 9 a terminal 10 of the mains is connected to the motor 2, which is on the other hand connected to one end of the primary coil 11 of a transformer 12. The other end of the primary coil 11 is connected to a conductor 13. Between the conductor 13 and conductor 14, which is connected to another terminal 15 of the mains when the mains switch 9, is closed, a large number of switches 16, 16' . . . is arranged in parallel, only two of which are shown in the drawing. There may be for example twenty to fifty switches but if necessary a much higher number of such switches may be provided without difficulty. It will be seen that with the main switch 9 closed the input circuit is closed by closing any one of the switches 16, 16' . . . etc., so that the motor 2 is set in motion and the transformer 12 is energised.

To the secondary coil 17 of the transformer 12 a full way rectifier 18 is connected, to the poles denoted + and − of which a smoothing condenser 19 is connected. A relay 20 is provided with a switch 21 which is closed when the relay is energised, and thereby connects the negative pole of the rectifier 18 to a line 22. Between the line 22 and a line 23 connected to the positive pole of the rectifier, via impulse counters 24, 24' . . . etc. are connected in parallel, which are associated with the switches 16, 16' . . ., respectively. It will be seen that when any of the switches 25, 25' . . . etc. is closed the respective impulse counter 24, 24' . . . etc. receives a current impulse, any time the switch 21 is closed. The relay 20 is provided with a delaying condenser 26, so that the switch 21 remains closed even when the relay 20 is energised for a very short period only of a certain minimum duration, for example of 50 milliseconds. The minimum duration of the impulse is so chosen that a safe response of the impulse counters 24, 24' . . . etc. respectively, is assured for every impulse applied.

Between the two poles of the rectifier 18 moreover the relay 20 is connected with an impulse generator switch 27 belonging to an impulse generator 28. The impulse generator 28, the design of which will be described later in more detail, is driven from the metering pump 3, and is so designed that it closes the switch 27 once and opens it again immediately any time a quantity of 0.1 litre of liquid fuel has been dispensed. It is clear that, by the aid of relay 20, that one of the impulse counters 24 . . . receives an impulse which is connected to the lines 22 and 23 by a closed switch 25 . . ., any time the impulse generator switch 27 is closed.

The mutually associated switches 16 and 25, 16' and 25' . . . etc. are arranged in lock switches 29, 29' . . . etc. of conventional kind, each being provided with a key 30, 30' . . . etc. respectively. All the impulse counters and lock switches are housed in a meter casing 31 which is arranged near the pillar 1.

As compared with the known metering mechanisms mentioned hereinabove, the auxiliary meters of which are capable of being mechanically coupled to the liquid metering mechanism, the metering mechanism described has considerable advantages. The numerous driving and interlocking elements required for a mechanical coupling, which are cumbersome and expensive, are dispensed with. Moreover the number of auxiliary meters may be increased without difficulty in the course of time, when this is found desirable, which is not possible with mechanical metering mechanism. The latter become extraordinarily voluminous, complicated and expensive with an increasing number of auxiliary meters, while with the electrical counting mechanism described, in case another auxiliary meter is required, merely another lock switch with its auxiliary meter is to be connected to the lines 13, 14, 22 and 23. The metering mechanism described can moreover be readily fitted to an existing filling station. The transformer 12, the rectifier 18 and the relay 20 may be housed also in the meter casing 31, if desired, or when in an existing pillar there is not sufficient space available. The impulse generator 28 on the other hand will be conveniently placed as closely as possible to the liquid metering mechanism, which however need not necessarily operate at the same time also as a pump.

The impulse generator 28 may be used in conjunction with any liquid metering mechanism desired, regardless of whether in the plant concerned a shorter or a longer period is required for the dispensing of one litre of fuel. This is due to the fact, that the period during which the impulse generator switch 27 is closed at any time, does not depend on the speed at which the impulse generator 28 is driven, which will now be described in more detail.

The impulse generator 28 according to FIG. 2 has two cam discs 32 and 33, which are fixedly connected to or integral with one another and are journalled idly on a shaft 34, which performs a full revolution as one litre of fuel is dispensed. A dog 35 mounted on the shaft 34 engages into a recess 36 of the discs 32 and 33, which forms an abutment 37 for the dog 35. The angular distance between the abutment 37 and the opposite shoulder 38 must allow a play of at least 18° to the dog.

The cam disc 32 has a star-shaped profile with ten prongs 39 spaced at an angular pitch of 36° from one another, and joined to each other by concave profile sections 40. On the cam disc 32 rests a holder roller 42 journalled on the free end of a lever 41 and forced against the cam disc 32 by a spring 43 engaging on this lever.

The cam disc 33 has likewise a star-shaped profile with ten prongs 44 spaced at an angular pitch of 36° from one another but joined to each other by profile sections 45 of constant radius. The prongs 44 are offset from the prongs 39 by a small angle α in the clockwise sense. A feeler 46 is provided at one end with a sensing roller 47 and at the other end with a contact piece 27′ opposite to which there is a contact piece 27″. The two contact pieces 27′ and 27″ form between them the switch 27. A spring 48 keeps the roller 47 in contact with the cam disc 33.

The impulse generator described operates as follows: in the position illustrated the holder roller 42 detains the cam discs 32 and 33 in that it tends to remain at the lowest point of the concave profile section 40, under the bias of the spring 43. The shaft 34 turns in the anticlockwise sense, so that the dog 35 abuts the abutment 37. From this moment the cam discs 32 and 33 are positively carried along in rotation by the shaft 34. After the cam discs 32 and 33 have turned 18°, the roller 42 rests just on a prong 39. As soon as the roller 42 has cleared the prong 39 only a tiny amount, it bears on the right hand flank of this prong which causes a very quick turning of the cam discs 32 and 33 another 18° until the roller 42 is at the lowest point of the subsequent profile section 40, i.e. the cam discs precede the rotation of the shaft 34 by 18°. At this very quick turning of the cam discs 32 and 33, which is independent of the speed of the shaft 34, the sensing roller 47 is raised by the prong 44, so that the contact pieces 27′ and 27″ contact one another. The contact is however interrupted again immediately, since the cam discs 32 and 33 come to a standstill only, when the sensing roller 47 has cleared the prong 44.

The main advantage of the impulse generator described is, that the switch 27 never remains closed, irrespective of the position, in which the shaft 34 comes to a standstill after the motor 2 has been switched off, which would not be the case with the use of a simple switching cam. If the switch 27 were however left in the closed position, a metering impulse would be generated immediately when operating a lock switch 29, while in reality no fuel had run through the metering mechanism. Thereby the same quantity of fuel of 0.1 litre would be counted twice, namely debited to two different consumers.

It should further be noted that in carrying out the metering mechanism described in practice of course all the safety measures are to be kept as prescribed for filling stations, for example as regards grounding, explosion-proof design of the relays, switches, etc.

Instead of using two impulse current circuits as in the metering mechanism described, one of which contains the impulse generator switch 27 and the relay 20, while the other one contains the relay switch 21 and the switches 25, 25′ . . . etc. shunted in parallel to one another, it would in principle be possible to provide a single impulse current circuit only with the contacts 27 and 25, 25′ . . . etc. in it. In this case one would however have to provide very sensitive and expensive impulse counters 24, 24′ . . . etc. The switches 16, 16′ . . . etc. need not necessarily be arranged parallel to one another directly in the circuit of the motor 2. They may instead interrupt the circuit of the latter in their inoperative position by means of a relay.

While I have herein described and illustrated in the accompanying drawing what may be considered a typical and particularly useful embodiment of my said invention, I wish it to be understood that I do not limit myself to the particular details and dimensions described and illustrated; for obvious modifications will occur to a person skilled in the art.

What I claim as my invention and desire to secure by Letters Patent, is:

1. A metering mechansim for a filling station comprising a pump designed as a main metering mechanism and capable of pumping the liquid fuel dispensed by the filling station, an electric driving motor operatively connected to said pump, a main metering counter for recording the total amount of liquid fuel pumped by said pump, an electrical impulse generator coupled to said pump and operated thereby, said impulse generator having impulse-transmitting contacts closable after passage of predetermined increments of liquid fuel through said pump, a plurality of electric impulse counters each capable of being electrically connected to said impulse generator, and a plurality of electric lock switches each associated with and electrically connected to one of said impulse counters and operable by an individual key to connect its associated impulse counter to said impulse generator, whereby said associated impulse counter then meters the quantity of liquid fuel dispensed while its associated switch is closed by its individual key, and each of said lock switches including two switches, one of said two switches being connected into the circuit of its associated impulse counter and the other keeping the circuit of said electric motor open until the lock switch is operated.

2. A metering mechanism for a filling station comprising a pump designed as a main metering mechanism and capable of pumping the liquid fuel dispensed by the filling station, an electric driving motor operatively connected to said pump, a main metering counter for recording the total amount of liquid fuel pumped by said pump, an electrical impulse generator coupled to said pump and operated thereby, said impulse generator having impulse-transmitting contacts closable after passage of predetermined increments of liquid fuel through said pump, a plurality of electric impulse counters each capable of being electrically connected to said impulse generator, and a plurality of electric lock switches each associated with and electrically connected to one of said impulse counters and operable by an individual key to connect its associated impulse counter to said impulse generator, whereby said associated impulse counter then meters the quantity of liquid fuel dispensed while its associated switch is closed by its individual key, and two pulse circuits for said metering mechanism, one of said pulse circuits including the impulse-transmitting contacts of said impulse generator and a relay having retarded de-energization, and the other of said pulse circuits including a switch of said relay, one of said electric impulse counters and a contact of the electric lock switch associated with said electric impulse counter.

3. A metering mechanism as claimed in claim 1, wherein the second switches of said lock switches are shunted in parallel to one another and connected directly into the circuit of said electric motor.

4. A metering mechanism as claimed in claim 3, comprising a main switch, a hook mechanically coupled to the said main switch, a filling hose hydraulically connected to the said pump and a discharge valve arranged at the free end of the said filling hose and when not in use hung on the said hook, the said hook automatically closing the said main switch when the said discharge valve is taken off the said hook.

5. A metering mechanism as claimed in claim 3, comprising in addition a main switch and a transformer, having a primary coil and a secondary coil, the said main switch and the said primary coil being connected into the circuit of the said electric motor, and the said secondary coil being connected to the said impulse generator.

6. A metering mechanism as claimed in claim 5, comprising two impulse circuits, one including an impulse generator switch of the said impulse generator and a relay coil, and the other one of said impulse circuits containing a relay switch operated by said relay coil, and the second switches of the said parallel shunted lock switches.

7. A metering mechanism as claimed in claim 6, comprising a full-way rectifier and a smoothing condenser connected between the said secondary transformer coil and the said two impulse circuits.

8. A metering device as claimed in claim 6, wherein the said impulse generator comprises cam means and resilient follower means operatively contacting said cam means and operatively connected to the said impulse generator switch, keeping the said switch normally open and only instantaneously closing the said switch in response to the said cam means, independently of the speed at which the said impulse generator is driven by the said main fuel metering means.

References Cited in the file of this patent
UNITED STATES PATENTS

| | | |
|---|---|---|
| 2,510,093 | Ferguson et al. | June 6, 1950 |
| 2,522,845 | Stevens | Sept. 19, 1950 |
| 2,838,237 | Spaunburg et al. | June 10, 1958 |
| 2,923,438 | Logan et al. | Feb. 2, 1960 |